United States Patent [19]
Chang et al.

[11] Patent Number: 6,115,268
[45] Date of Patent: Sep. 5, 2000

[54] METHOD AND APPARATUS FOR SUPPLYING UNINTERRUPTED POWER

[75] Inventors: Yu-Ming Chang; Fang-Yi Lu, both of Taoyuan Shien, Taiwan

[73] Assignee: Delta Electronics Inc., Taoyuan Shien, Taiwan

[21] Appl. No.: 09/132,173

[22] Filed: Aug. 11, 1998

[30] Foreign Application Priority Data

Aug. 11, 1997 [TW] Taiwan ................................. 86111488

[51] Int. Cl.$^7$ ................................ H02J 3/00; H02J 9/06
[52] U.S. Cl. ........................... 363/34; 323/285; 323/299; 307/66
[58] Field of Search ................................. 363/34, 37, 84, 363/89, 97; 323/271, 282, 285, 299; 307/45, 66

[56] References Cited

U.S. PATENT DOCUMENTS

| | | |
|---|---|---|
| 5,631,814 | 5/1997 | Zak ........................................... 363/37 |
| 5,737,204 | 4/1998 | Brown ....................................... 363/89 |
| 5,790,391 | 8/1998 | Stich et al. ............................. 363/34 X |

*Primary Examiner*—Jessica Han
*Attorney, Agent, or Firm*—Klein & Szekeres, LLP

[57] ABSTRACT

An expedient and simplified uninterrupted power-supplying apparatus is provided. Such apparatus includes a power-storing device for storing an electric signal in a first instance and releasing the electric signal in a second instance, an AC/DC converting device for converting an AC signal provided by the power source into a DC signal, a DC/DC converting device for receiving the DC signal, and generating the uninterrupted power and storing the electric signal in the power-storing device in response to a voltage thereof in the first instance, and receiving the released electric signal and generating the uninterrupted power in the second instance, and a controlling device for controlling the DC/DC converting device to store the electric signal in the power-storing device and making the AC/DC converting device vary the DC signal in response to the voltage of the power-storing device. The invention also discloses a method for supplying an uninterrupted power.

15 Claims, 14 Drawing Sheets

METHOD AND APPARATUS FOR SUPPLYING UNINTERRUPTED POWER

FIELD OF THE INVENTION

The present invention relates to a power supplying apparatus, and more particularly to an apparatus for supplying an uninterrupted power.

BACKGROUND OF THE INVENTION

The uninterrupted power supply (UPS) finds its more and more extensive application nowadays, especially in a system requiring a stable power source, e.g. a computer room in order not to interrupt a task under execution. As an example, for a computer encountering an interrupted power source, if the interrupted task is just beginning to run, we just need to reexecute the task. Nevertheless, if a heavy task is involved in and is nearly half performed, no one could then doubt the importance of the UPS.

As shown in FIG. 1 showing a prior UPS system, when the power source is normal, an AC/DC converter 1 and a DC/AC converter 2 will respectively provide DC and AC outputs, and the power source will charge through a charger 5 a power storing device 3. Thus, when the power source becomes interrupted, power storing device 3 will discharge in order to provide DC and AC outputs respectively through a DC/DC converting device 4 and DC/AC converter 2.

Such UPS system suffers from some disadvantages. Firstly, charger 5 is required for charging power storing device 3. Charger 5, however, has a cost not less than that of an electric converting device and includes a plurality of switching circuits which will generate many harmonic waves in operation and will in turn adversely affect the power source quality, e.g. the power factor (which could be overcome by introducing a power factor compensator which, nevertheless, is not cost-effective.)

The larger the capacity of the UPS is, the bigger the charger will be which means the more the cost thereof will be. In addition, there is a safety problem in that there is no galvanic isolation between the input and output ends.

It is therefore attempted to obviate the provision of the charger in order to solve the problems above-described.

SUMMARY OF THE INVENTION

An objective of the present invention is to provide an apparatus for supplying an uninterrupted power source without a charger.

It is further an object of the present invention to provide an apparatus for supplying an uninterrupted power source which operates the power storing device at a safe voltage (lower than 60 Volts) for obtaining the expediency of on-line displacement by two-stage charging which means that there are a constant current charging first stage and a constant voltage charging second stage.

Referring now back to FIG. 1, the present invention is based on the recognition that we can establish a path between the power source and the power storing device 3 through the DC/DC converting device 4 instead of the charger 5. Specifically, in the past, DC/DC converting device 4 is dedicated to be used while power storing device 3 is discharging. In a normal condition, however, the output end 11 of the AC/DC converter 1 already has a potential being dedicated to be used by the DC/AC converter 2. Accordingly, if the potential at output end 11 can be applied to be used by power storing device 3, charger 5 could thus be dispensed with.

According to the present invention, a method for supplying an uninterrupted power by a utility power source, a power-storing device and a DC/DC converting device includes the steps of (a) providing the uninterrupted power by the utility power source when an input signal provided by a power source is greater than a first specific value, (b) causing the DC/DC converting device to receive the input signal for generating an output signal to charge the power-storing device when a parameter of the power-storing device is less than a second specific value, (c) varying the output signal of AC/DC converter in response to the parameter of the power-storing device, and (d) causing the power-storing device to provide the uninterrupted power when the input signal is less than the first specific value.

Certainly, in the step (a), the uninterrupted power can be provided by the DC/DC converting device. The input signal can be an alternative current (AC) signal.

Preferably before the step (a), there further is a step of (a1) converting the input signal from the AC signal into a direct current (DC) signal.

Certainly the parameter of the power-storing device can be an electric voltage thereof. In the step (b), the power-storing device can be charged by a two-stage method.

Preferably the two-stage method includes steps of (b1) applying a constant current signal as the output signal when the voltage of the power-storing device is less than a third specific value, and (b2) applying a constant voltage signal as the output signal when the voltage of the power-storing device is between the second specific value and the third specific value.

According to another aspect of the present invention, an apparatus for supplying an uninterrupted power by a utility power source, includes a power-storing device for storing an electric signal in a first instance and releasing the electric signal in a second instance, an AC/DC converting device electrically connected to the utility power source for converting an AC signal provided by the utility power source into a DC signal, a DC/DC converting device electrically connected to the AC/DC converting device and the power-storing device for receiving the DC signal, generating the uninterrupted power, and storing the electric signal in the power-storing device in response to a voltage thereof in the first instance, and receiving the released electric signal and generating the uninterrupted power in the second instance, and a controlling device electrically connected to the power-storing device and coupled with the AC/DC converting device for controlling the DC/DC converting device to store the electric signal in the power-storing device and making the AC/DC converting device vary the DC signal in response to the voltage of the power-storing device.

Certainly, the AC/DC converting device can include a power factor controller coupled with the controlling device for receiving a feedback signal generated by the controlling device and generating a driving sig, and an AC/DC converter electrically connected to the power source and the power factor controller for receiving the AC signal, and generating and varying the DC signal in response to the driving signal.

Certainly, the DC/DC converting device can include a DC/DC converter electrically connected to the AC/DC converting device and the power-storing device for converting one of the DC signal and the electric signal into the uninterrupted power, and charging the power-storing device, and a pulse-width modulating controller electrically coupled with the DC/DC converter for driving the DC/DC converter.

Alternatively, the DC/DC converter can include a transformer including a first winding, a second winding, and a third winding coupled with each other, a first switching circuit electrically connected to the AC/DC converting device and to the first winding for converting the DC signal into a first signal transmitted to the first winding in the first instance, a second switching circuit electrically connected to the power-storing device and to the second winding for receiving a second signal generated by the second winding in response to the first signal and converting the second signal into the electric signal to charge the power-storing device in the first instance, and receiving the electric signal from the power-storing device and generating a third signal transmitted to the second winding in the second instance, and a rectifying circuit electrically connected to the third winding for converting the first signal or the third signal into the uninterrupted power.

Certainly the switching circuit can be a topology including four transistors and four diodes.

Alternatively the winding can be a center-tapped winding, and the switching circuit can be a topology including two transistors and two diodes.

As her examples, the switching circuit can be a topology including two transistors, two diodes, and two capacitors, or a topology including two transistors and four diodes, or a topology including a transistor and a diode.

Certainly the controlling device can include a first controller coupled with the power-storing device and with the AC/DC converting device for sensing a current of the electric signal flowing into the power-storing device, and sending a first control signal to the AC/DC converting device to decrease the DC signal when the current is greater than a specific value, and a second controller electrically connected to the power-storing device and coupled with the AC/DC converting device for sensing the voltage of the power-storing device and sending a second control signal to the AC/DC converting device to make the AC/DC converting device regulate the DC signal.

Certainly the present apparatus can further include a DC/AC converter electrically connected to the DC/DC converting device for converting the uninterrupted power from a DC-type into an AC-type. The power-storing device can be a rechargeable battery.

The present invention may best be understood through the following description with reference to the accompanying drawings, in which:

DETAILED DESCRIPTION OF THE PREFERRED EMBODIMENT

Figure 1:
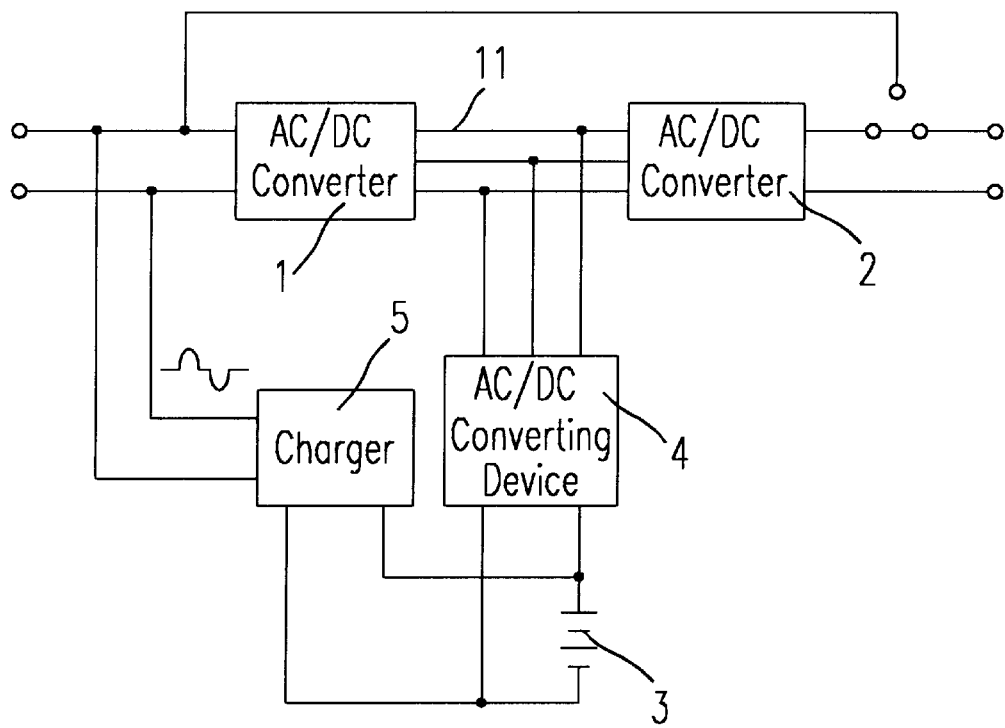
FIG. 1 is a schematic block diagram showing a prior UPS system.
Figure 2:
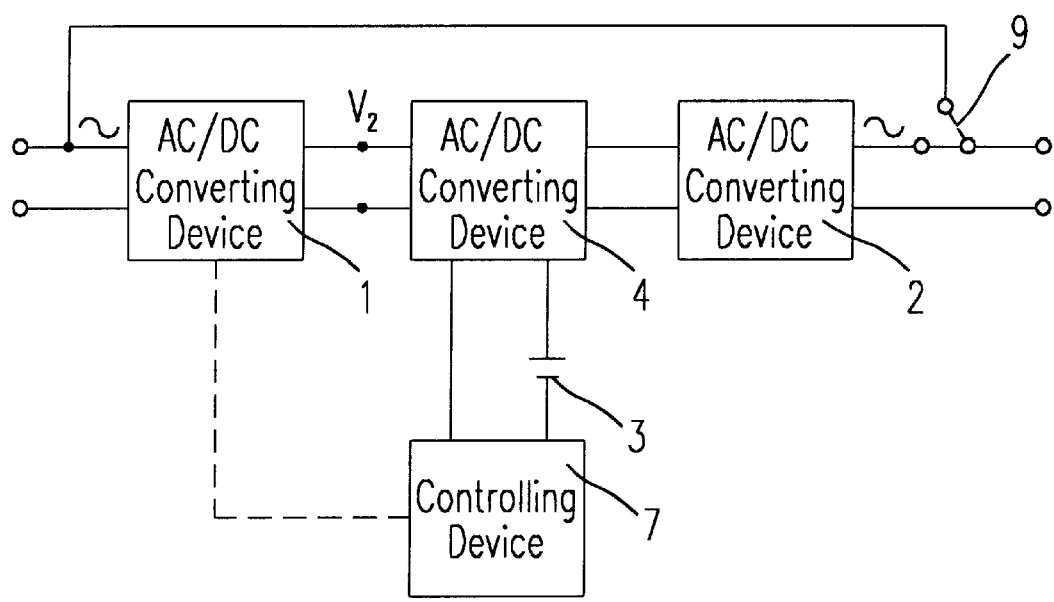
FIG. 2 is a schematic block diagram showing a UPS system according to the present invention.

Referring now to FIG. 2, there is schematically shown an apparatus for supplying an uninterrupted power which includes a power-storing device 3 for storing an electric signal in a first instance and releasing the electric signal in a second instance, an AC/DC converting device 1 electrically connected to a utility power source for converting an AC signal provided by the utility power source into a DC signal, a DC/DC converting device 4 electrically connected to AC/DC converting device 1 and power-storing device 3 for receiving the DC signal, and generating the uninterrupted power and storing the electric signal in power-storing device 3 in response to a voltage thereof in the first instance, and receiving the released electric signal and generating the uninterrupted power in the second instance, a DC/AC converter 2 electrically connected to DC/DC converting device 4 for converting the uninterrupted power from a DC-type into an AC-type, a controlling device 7 electrically connected to power-storing device 3 and coupled with AC/DC converting device 1 for controlling DC/DC converting device 4 to store the electric signal in power-storing device 3 and making AC/DC converting device 1 regulate the DC signal in response to the voltage of power-storing device 3, and a switch 9 electrically connected to DC/AC converter 2 in a normal condition (as indicated by the solid line) and to the utility power source when the present UPS system malfunctions (as indicated by the dotted line).

Figure 3:
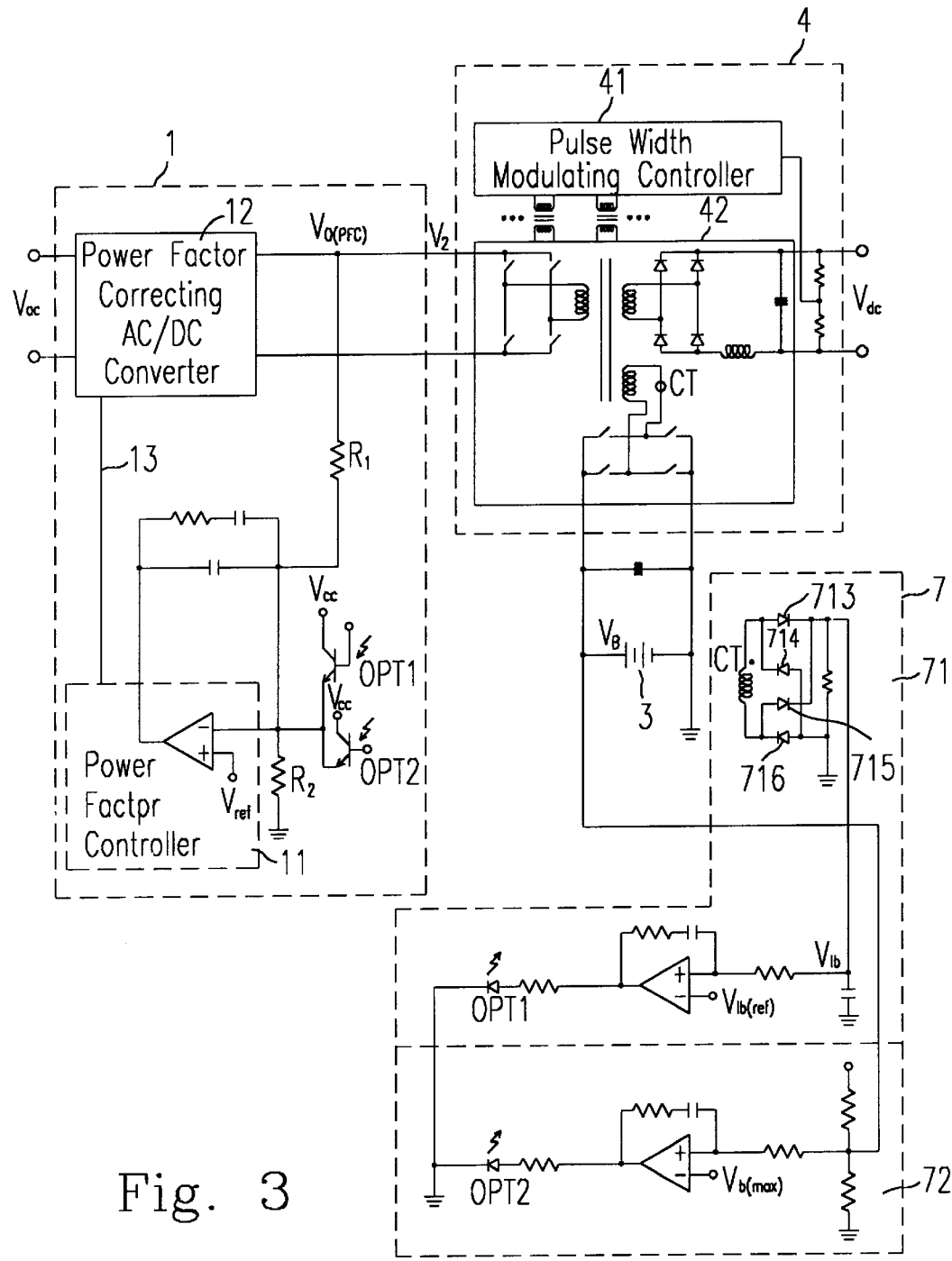
FIG. 3 is a circuit diagram showing how to charge the UPS system in FIG. 2.

As shown in FIG. 3, a method for supplying an uninterrupted power by the power-storing device 3 and the DC/DC converting device 4 according to the present invention includes the steps of (a) providing the uninterrupted power (e.g. by DC/DC converting device 4) when an input signal provided by the utility power source is greater than a first specific value, (b) causing DC/DC converting device 4 to receive the input signal (voltage V2) for generating an output signal to charge power-storing device 3 when a parameter of power-storing device 3 is less than a second specific value, (c) regulating the AC/DC converter output signal in response to the parameter of power-storing device 3, and (d) causing power-storing device 3 to provide the uninterrupted power when the input signal is less than the first specific value. Certainly, before the step (a), we can convert the input signal from the AC signal into a direct current (DC) signal. The parameter of power-storing device 3 can be an electric voltage thereof. In a specific embodiment, power-storing device 3 is charged by a two-stage method which includes steps of (b1) applying a constant current signal as the output signal when the voltage of power-storing device 3 is less than a floating voltage thereof, and (b2) applying a constant voltage signal as the output signal when the voltage of power-storing device 3 tends to higher than the edge of the floating voltage thereof. Charging power storing device 3 to the floating voltage will enable its using period to be prolonged.

More specifically, the present UPS system receives an AC voltage Vac and outputs a DC voltage Vdc. Power storing device 3 ensures the provision of DC voltage Vdc if AC voltage Vac is interrupted. AC/DC converting device 1 inputs therein AC voltage Vac and outputs therefrom the transition DC voltage V2 to be converted by DC/DC converting device 4, which will charge power storing device or rechargeable battery 3 having a potential drop, into DC voltage Vdc. Controlling device 7 will regulate the power factor controller voltage the input voltage V2 for DC/DC converting device 4 according to the potential of power storing device 3. AC/DC converting device I includes a power factor controller 11 coupled with controlling device 7 for receiving a feedback signal generated by controlling device 7 and generating a driving signal 13, and a power factor correcting AC/DC converter 12 electrically connected to the utility power source Vac and power factor controller 11 for receiving the AC signal, and generating and regulating the DC signal V2 in response to the driving signal 13.

Controlling device 7 includes a first current feedback controller 71 coupled with power-storing device 3 and with AC/DC converting device 1 for sensing a current of the electric signal flowing into power-storing device 3, and sending a first control signal to AC/DC converting device 1 to decrease the DC signal V2 when the current is greater than a specific value, and a second floating voltage controller 72 electrically connected to power-storing device 3 and coupled with AC/DC converting device 1 for sensing the voltage of power-storing device 3 and sending a second control signal to AC/DC converting device 1 to make AC/DC converting device 1 regulate the DC signal V2. Specifically, when the current of battery 3 is too large so that the voltage signal Vib indicative of the current of battery 3 obtained through the current transformer CT and converted by rectifiers 713, 714, 715 & 716 is higher than the reference voltage Vib(ref) representing the set current, the voltage signal fedback to the power factor controller 11 will rise to narrow the duty cycle of the output driving signal 13 which in turn will lower down the transition DC voltage V2 outputted by the power factor correcting AC/DC converter 12 which then will in turn lower the charging current of battery 3 to the set level. The set constant current is determined by the current-representing reference voltage Vib(ref) so that the first constant current charging stage is achieved. If the current of battery 3 is lower ta the set value, the phototransistor OPT1 will be turned off.

So far as the second constant voltage charging stage is concerned, it is mainly controlled by floating voltage controller 72. When the potential of battery 3 is higher than Vb(max), the phototransistor will be turned on to narrow the duty cycle of the output driving signal 13 of power factor controller 11 to lower down the transition DC voltage V2 outputted from power factor correcting AC/DC converter 12 which will thus enable battery 3 to be charged at the constant floating voltage. Since the potential of battery 3 is controlled by the floating voltage controller 72, the maximum voltage of battery 3 can be controlled under a safe potential. Considering the expediency of on-line displacement, the safe voltage is suggested to be lower than 60V in order to prevent the operator from being shocked by a high electric power in displacement.

While not charging, the feedback of the resistor R1 plays the function of stabilizing the transition DC voltage V2. If the potential of transition DC voltage V2 is lower than the set value Vref, power factor controller 11 through the pulse width modulation technique will broaden the duty cycle of the driving signal 13 to raise the output transition DC voltage V2 of power factor correcting AC/DC converter 12. On the contrary, if the potential of transition DC voltage V2 is higher than the set value Vref, power factor controller 11 will shorten the breadth of the duty cycle of the driving signal 13 to reduce the output transition DC voltage V2 of power factor correcting AC/DC converter 12.

DC/DC converting device 4 includes a DC/DC converter 42 electrically connected to AC/DC converting device 1 and power-storing device 3 for converting one of the DC signal and the electric signal into the uninterrupted power, and charging power-storing device 3, and a pulse-width modulating controller 41 which can have a reference number UC3525 or be an Integrated Circuit (IC) having the similar function and is electrically coupled with DC/DC converter 42 for driving DC/DC converter 42.

Figure 4:
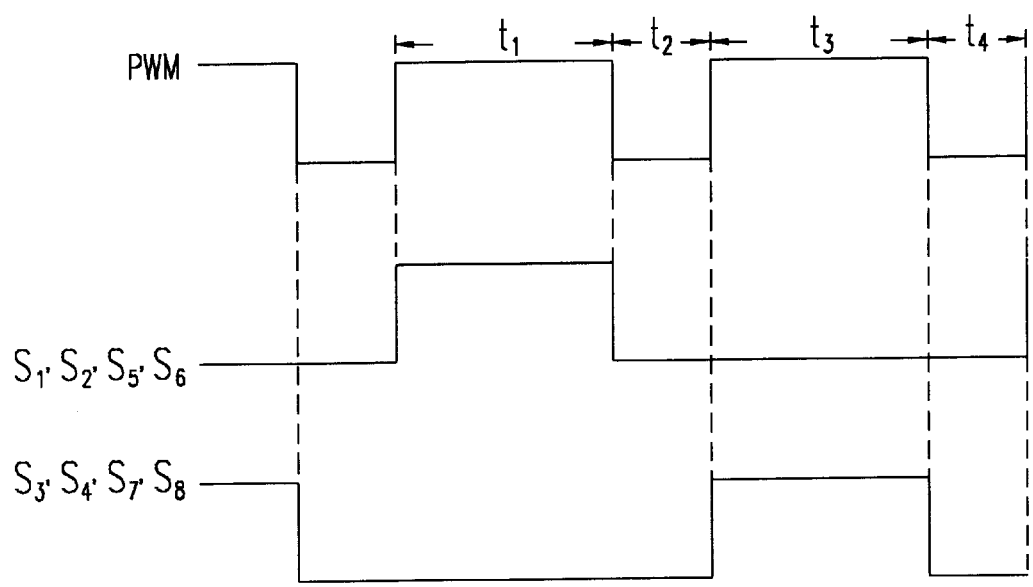
FIG. 4 is a time sequence for the switch operation of a DC/DC converter of a UPS system in FIG. 2.

FIG. 4 is a time sequence for the switch operation of DC/DC converting device of the present UPS system or the operation of pulse-width modulating controller 41.

Figure 5:
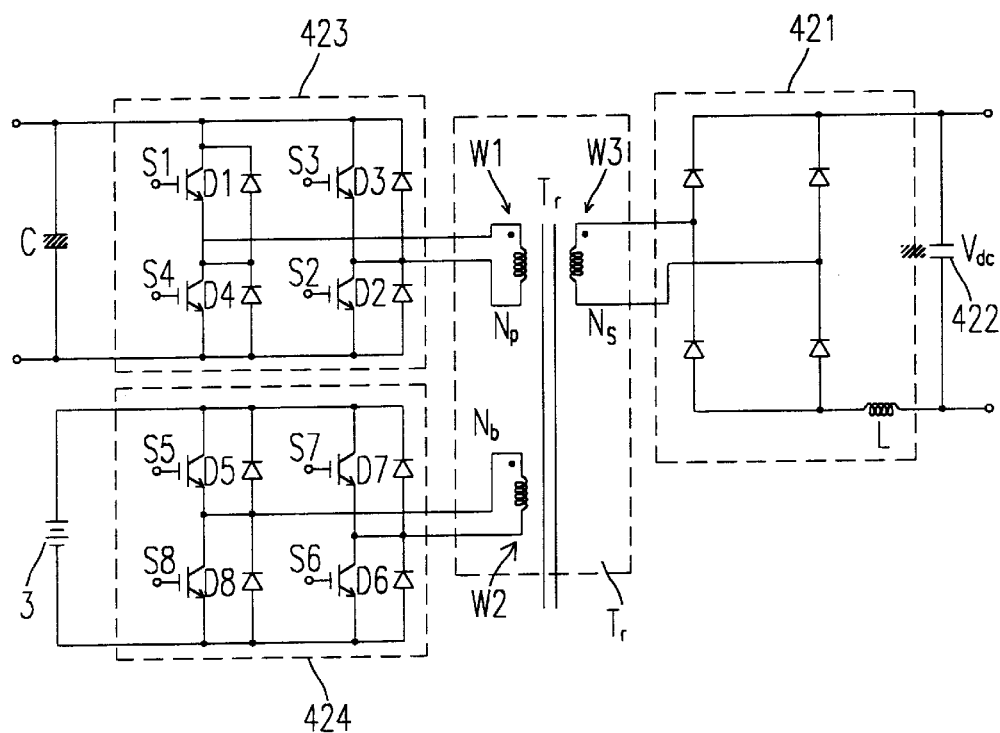
FIG. 5 is a schematic circuit diagram showing a first preferred embodiment of a DC/DC converter of a UPS system according to the present invention.

FIG. 5 is a schematic circuit diagram showing a first preferred embodiment of a DC/DC converter 42 of a UPS system according to the present invention which includes a transformer Tr having three inter-coupled windings w1, w2, w3 respectively having Np, Nb, Ns turns, a first switch circuit 423 electrically connected to AC/DC converting device 1 and to first winding w1 for converting the transition DC signal V2 into an AC source to be transmitted to first winding w1 when the potential of first winding w1 is larger than the result of the potential of second winding w2 multiplied by the quotient or tun ratio a=Np/Nb and for rectifying the AC source of first winding w1 into a DC source to be transmitted to transition DC voltage V2 when the potential of first winding w1 is smaller than the result of the potential of second winding w2 multiplied by the quotient a, a second switching circuit 424 electrically connected to power-storing device 3 and to second winding w2 for rectifying the AC source of second winding w2 into a DC source for charging power-storing device 3 when the potential of first winding w1 is larger than the result of the potential of second winding w2 multiplied by the quotient a and for converting the DC source of battery 3 into an AC source to be transmitted to second winding w2 when the potential of first winding w1 is smaller than the result of the potential of second winding w2 multiplied by the quotient a, a rectifying circuit 421 electrically connected to third winding w3 for providing the DC power Vdc.

Referring back to FIG. 4, the pulse PWM is the basic clock of the driving signal for transistor switches S1, S2, S3, S4, 5, S6, S7 & S8 where transistor switches S1, S2, S5 & S6 will simultaneously be on or off while transistor switches S3, S4, S57 & SS will simultaneously be off or on. Under the control of such driving signal, DC/DC converter 42 will operate as follows.

Figure 6A:
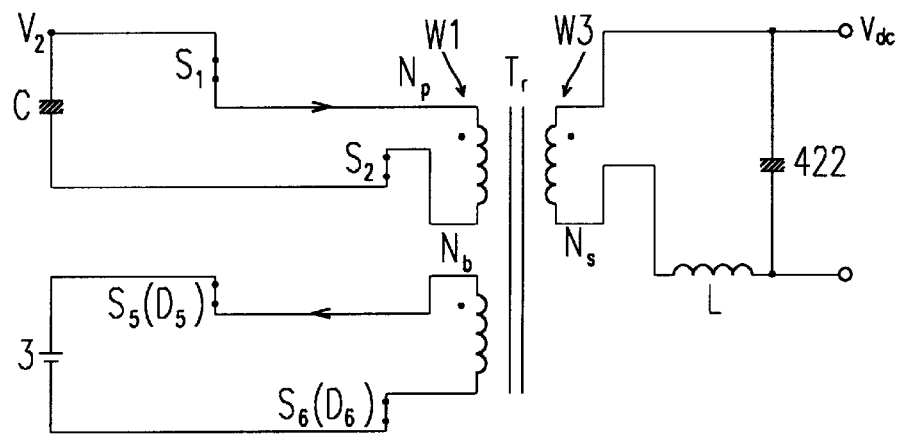
FIGS. 6A–6D respectively show 4 charging states of a DC/DC converter in FIG. 5.

As shown in FIG. 6A, during the t1 period, all transistor switches S1, S2, 5S & S6 will be on. The input power will supply power trough transformer Tr, rectifying device 421 and the output filtering circuit 422 to the output end and charge battery 3 through transformer Tr and diodes S5 (D5) & S6 (D6).

Figure 6B:
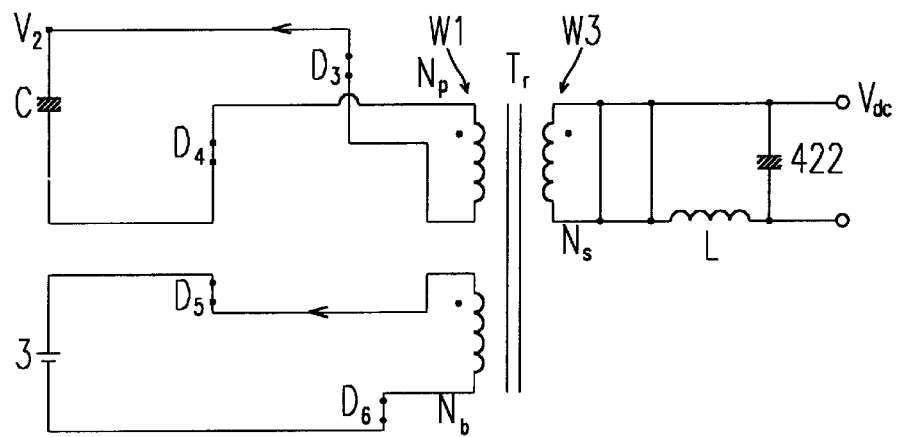

As shown in FIG. 6B, during the t2 period, all transistor switches S1, S2, S5 & S6 will be off. For inertial operation, the inductor L will fully conduct output rectifying device 421 to form a short-circuit phenomenon with transformer Tr so that the original leakage inductance of first winding w1 will transmit power through diodes D3 & D4 back to the input voltage V2 and the leakage inductance of second winding w2 will transmit power through diodes DS & D6 back to battery 3.

Figure 6C:
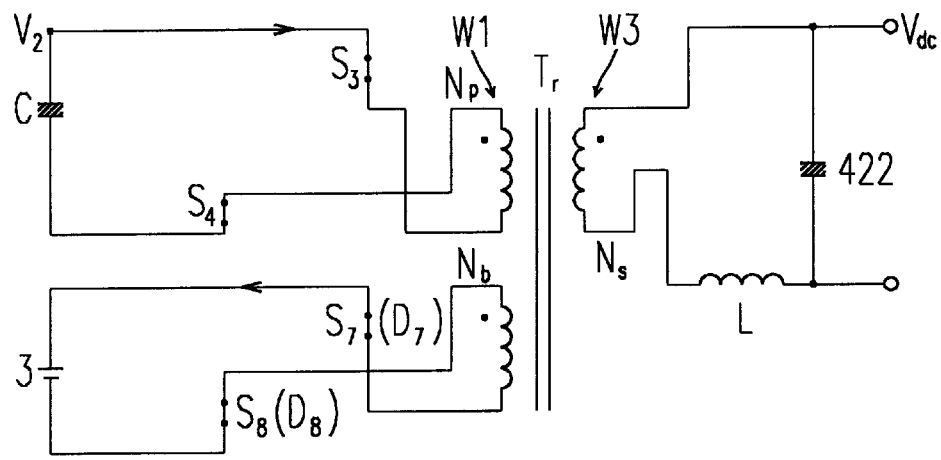

As shown in FIG. 6C, during t3 period, transistor switches S3, S4, S7 & S8 will be simultaneously on. The input power will supply power through transformer Tr, rectifying device 421 and the output filtering circuit 422 to the output end and charge battery 3 through transformer Tr and diodes D7 & D8.

Figure 6D:
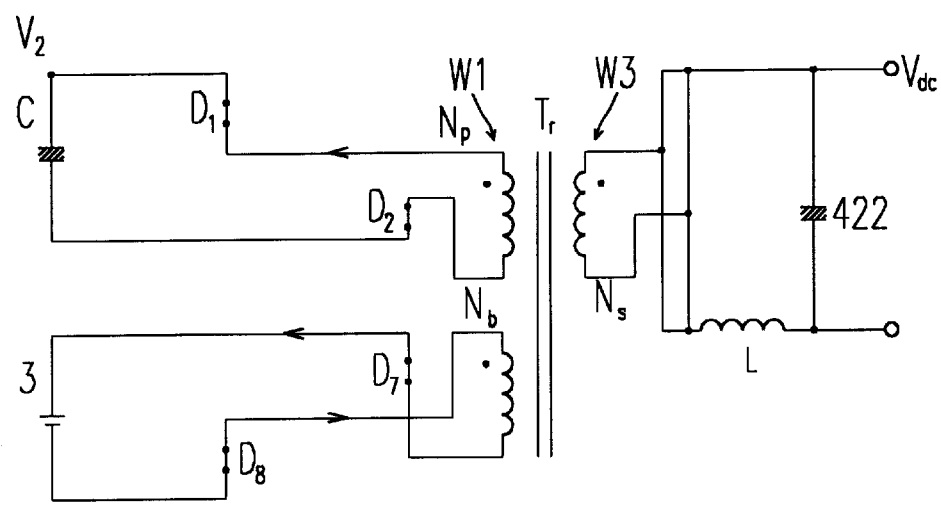

As shown in FIG. 6D, during t4 period, transistor switches S3, S4, S7 & S8 will be simultaneously off. For inertial operation, the inductor L will fully conduct output rectifying device 421 to form a short-circuit phenomenon with transformer Tr so that the original leakage inductance of first winding w1 will transmit power through diodes D1 & D2 back to the input voltage V2 and the leakage inductance of second winding w2 will transmit power through diodes D7 & D8 back to battery 3.

Figure 7A:
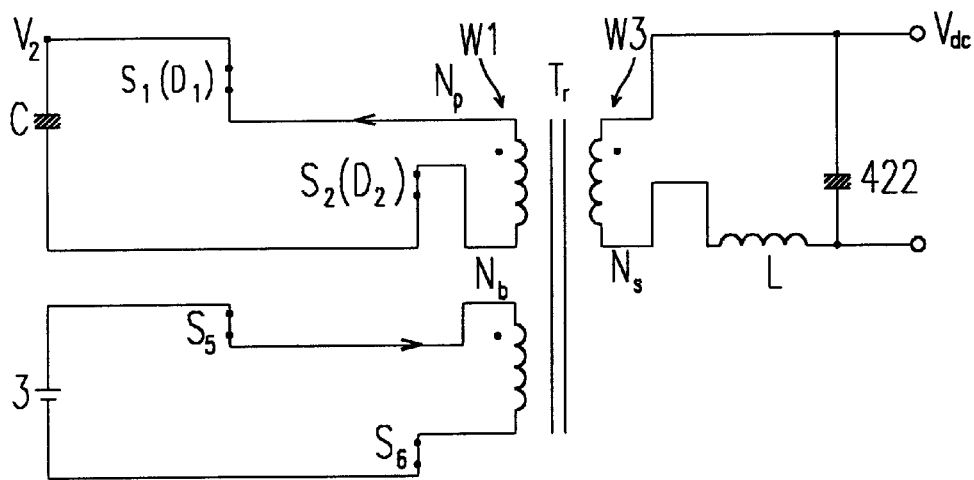
FIGS. 7A–7D respectively show 4 discharging states of a DC/DC converter in FIG. 5.

A discharging operation will occur when the input voltage V2 is lower than the result $(Np/Nb)V_B$ of the battery voltage $V_B$ multiplied by the turn ratio $Np/Nb$ which will happen when there is an interrupted utility power source. As shown in FIG. 7A, during the t1 period, all transistor switches S1, S2, S5 & S6 are still on, but the output power is provided by battery 3 because the voltage $(Np/Nb)V_B$ is higher than the voltage V2 so that the output voltage Vdc will not be affected by the interrupted power which enables the output of DC/AC converter 2 to find no break.

Figure 7B:
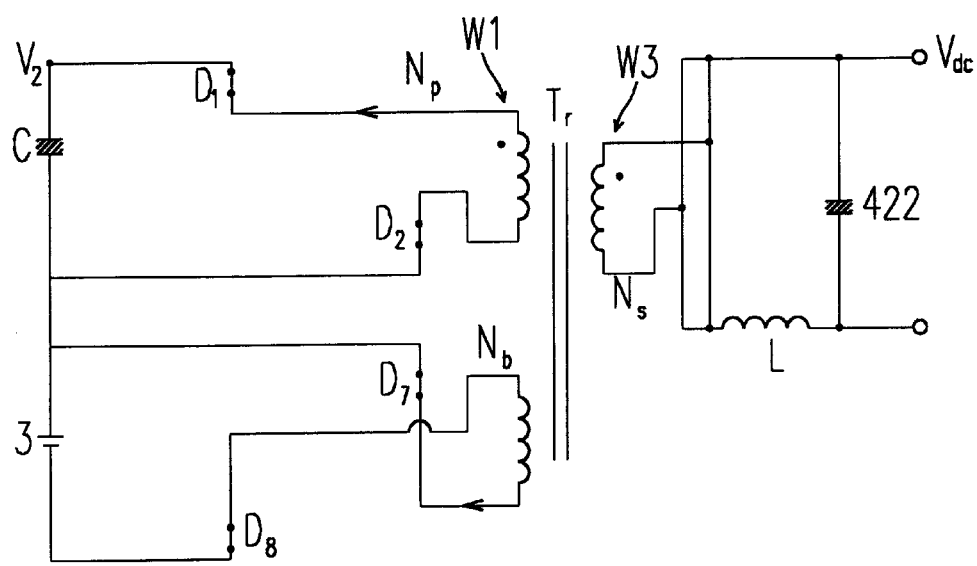

As shown in FIG. 7B, during the t2 period, all transistor switches S1, S2, S5 & S6 will be off. For inertial operation, the inductor L will folly conduct output rectifying device 421 to form a short-circuit phenomenon with third winding w3 of transformer Tr so that the original leakage inductance of first winding w1 will transmit power through diodes D1 & D2 back to the input capacitor C and the leakage inductance of second winding w2 will transmit power through diodes D7 & DS back to battery 3.

Figure 7C:
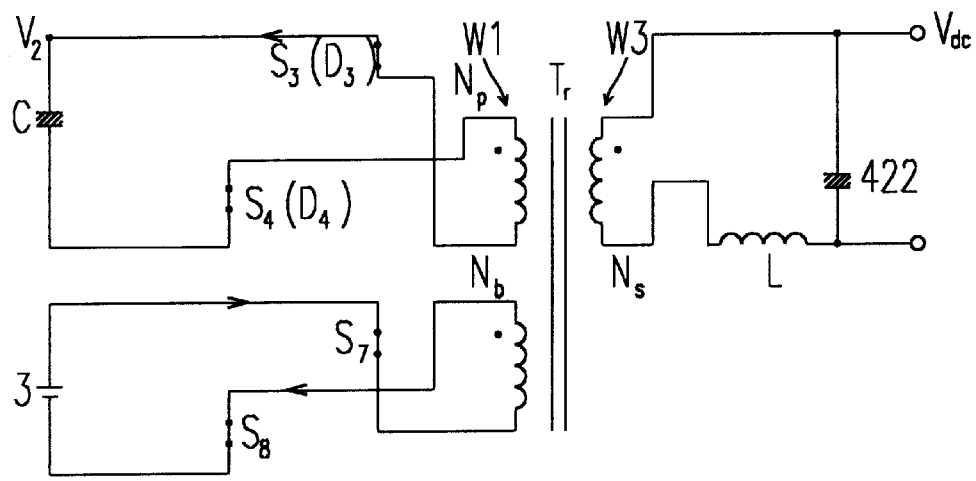

As shown in FIG. 7C, during the t3 period, all transistor switches S3, S4, S7 & SS are still on, but the output power is provided by battery 3 because the voltage $(Np/Nb)V_B$ is higher than the voltage V2 so that the output voltage Vdc will not be affected by the interrupted power which enables the output of DC/AC converter 2 to find no break.

Figure 7D:
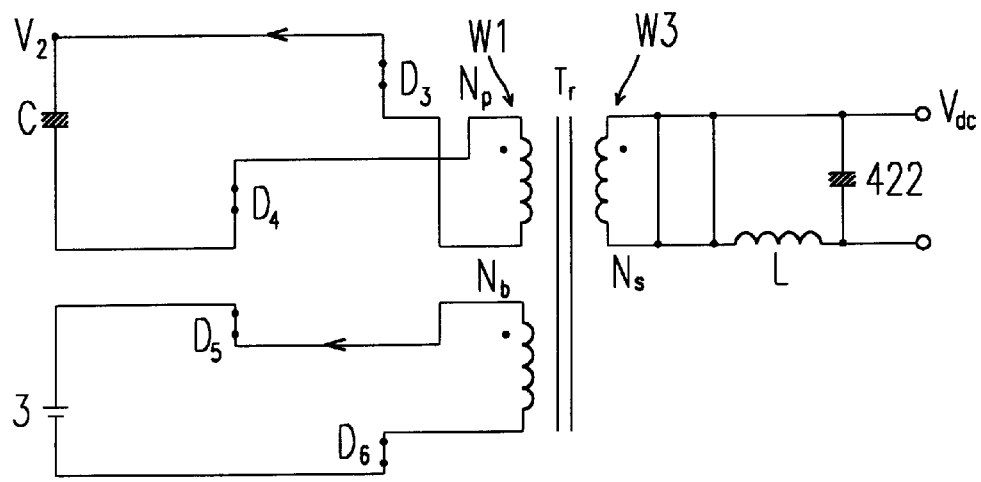
Figure 8:
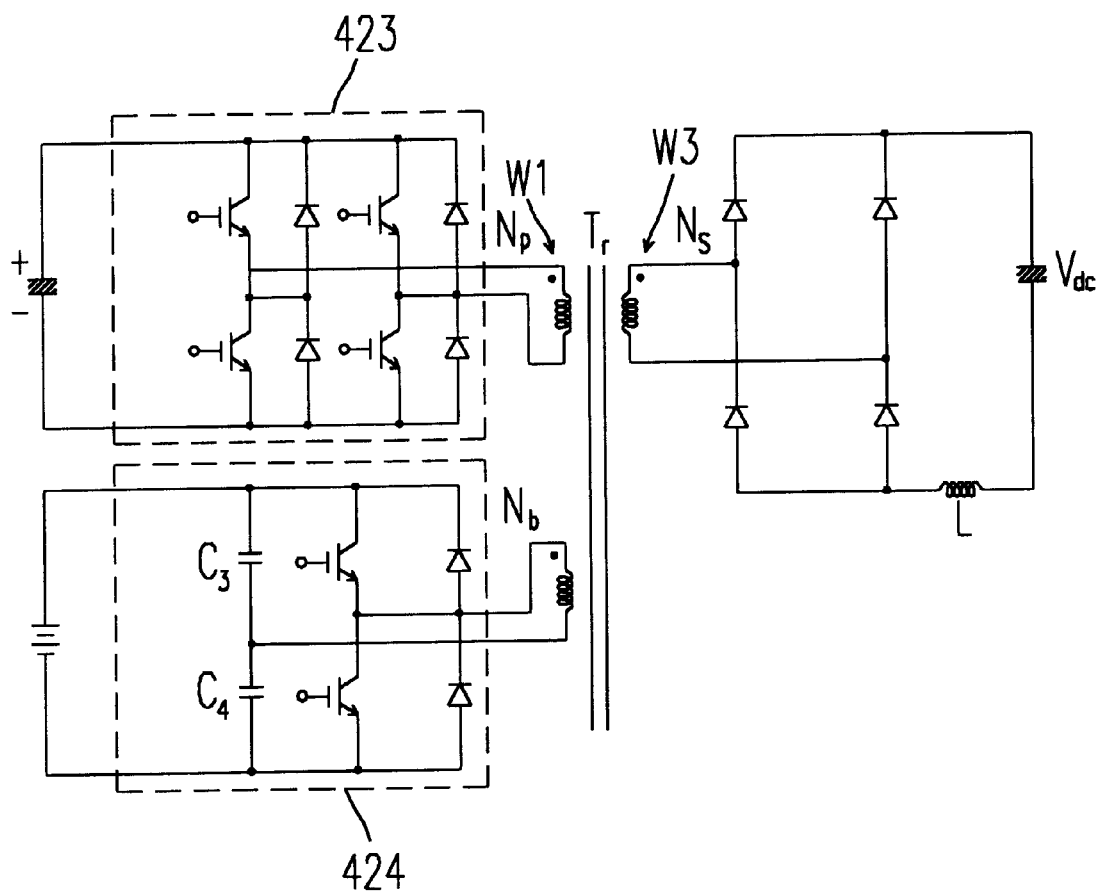
FIG. 8 is a schematic circuit diagram showing a second preferred embodiment of a DC/DC converter of a UPS system according to the present invention.
Figure 9:
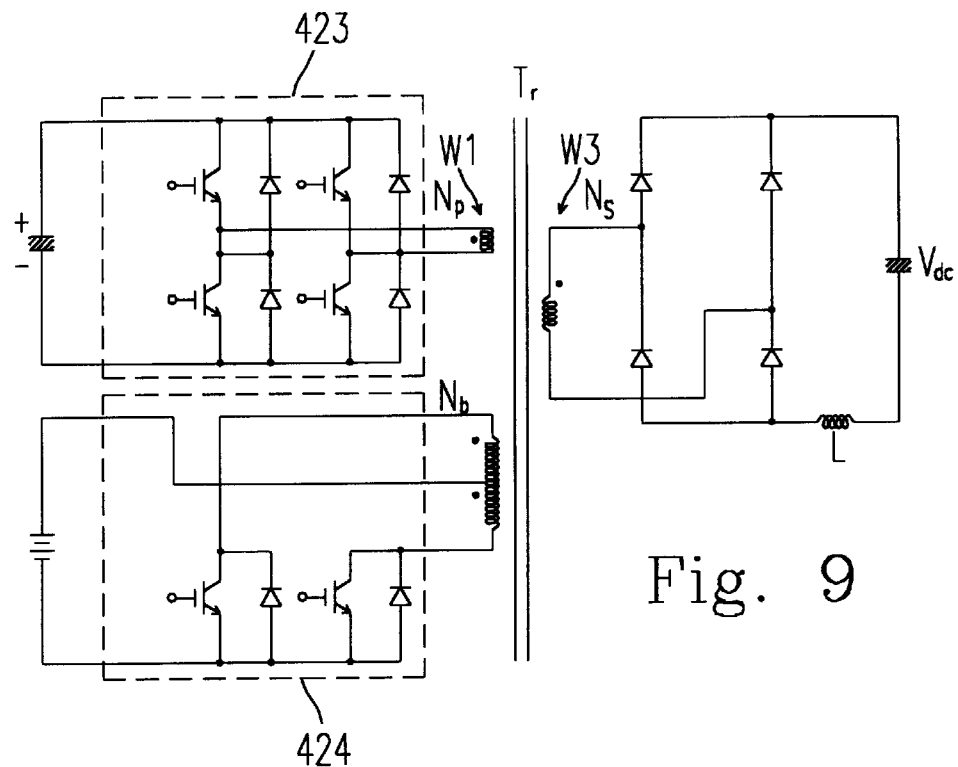
FIG. 9 is a schematic circuit diagram showing a third preferred embodiment of a DC/DC converter of a UPS system according to the present invention.
Figure 10:
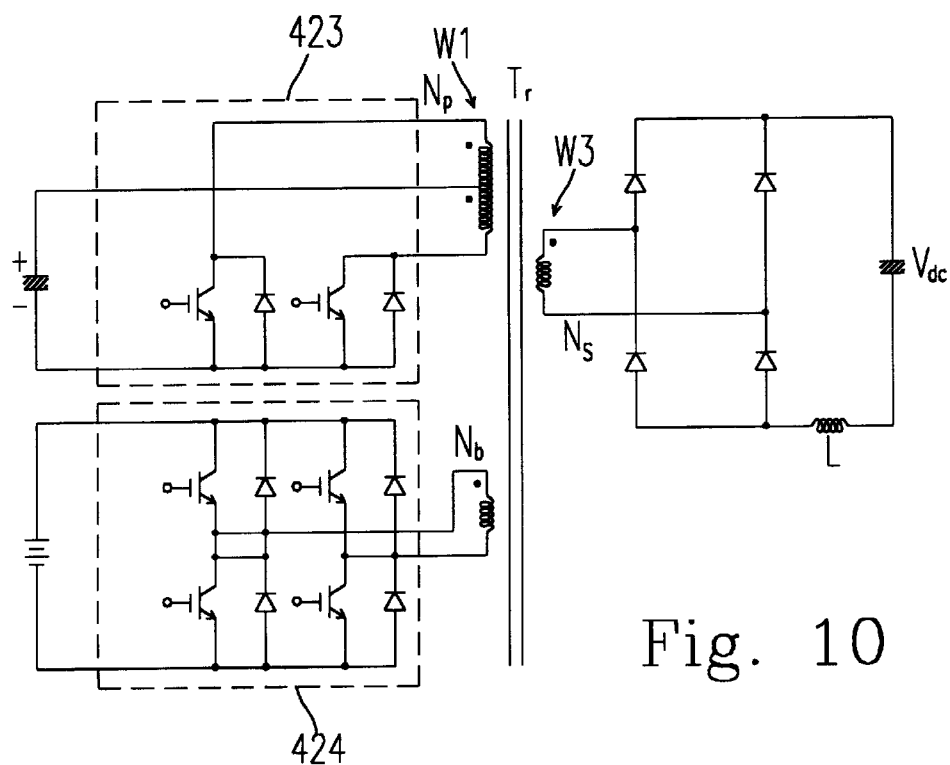
FIG. 10 is a schematic circuit diagram showing a fourth preferred embodiment of a DC/DC converter of a UPS system according to the present invention.
Figure 11:
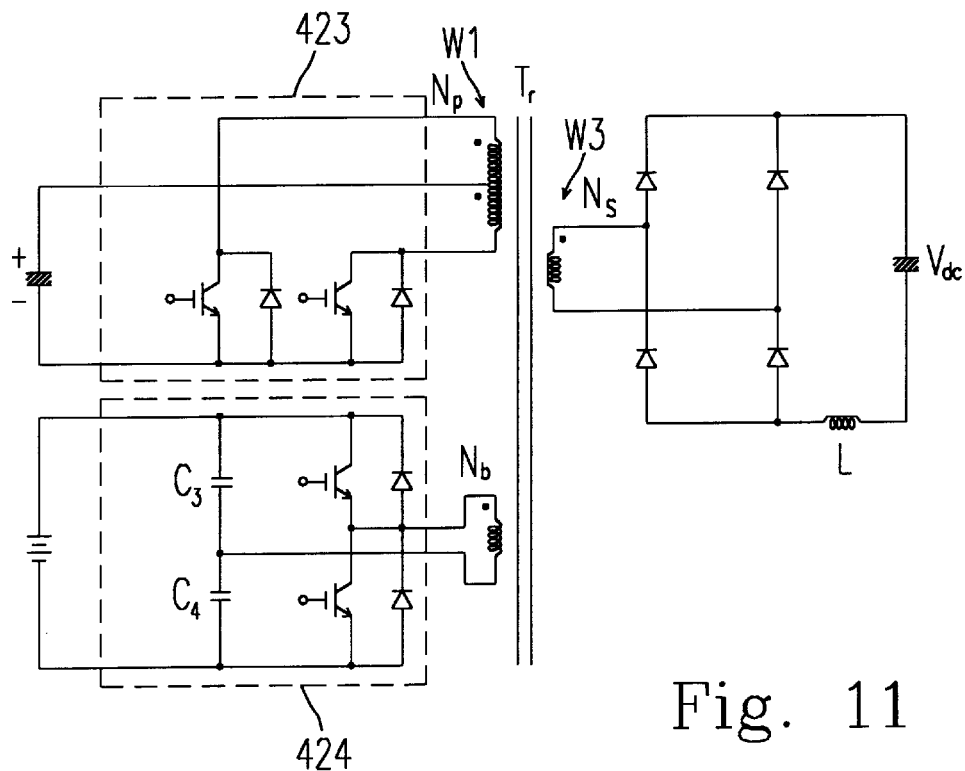
FIG. 11 is a schematic circuit diagram showing a fifth preferred embodiment of a DC/DC converter of a UPS system according to the present invention.
Figure 12:
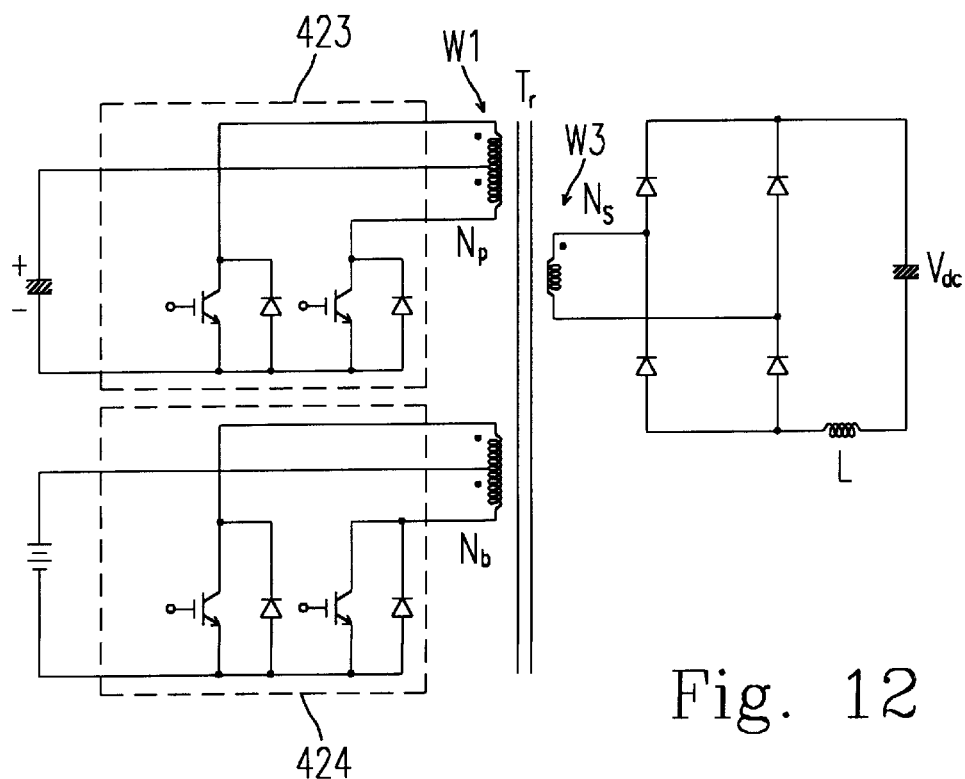
FIG. 12 is a schematic circuit diagram showing a sixth preferred embodiment of a DC/DC converter of a UPS system according to the present invention.
Figure 13:
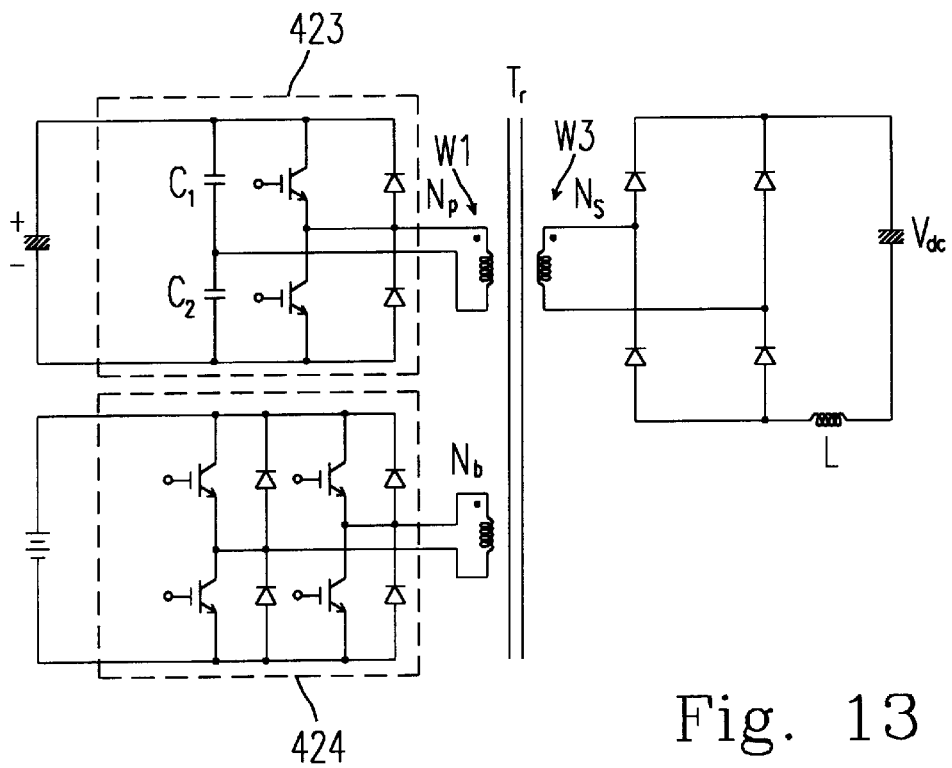
FIG. 13 is a schematic circuit diagram showing a seventh preferred embodiment of a DC/DC converter of a UPS system according to the present invention.
Figure 14:
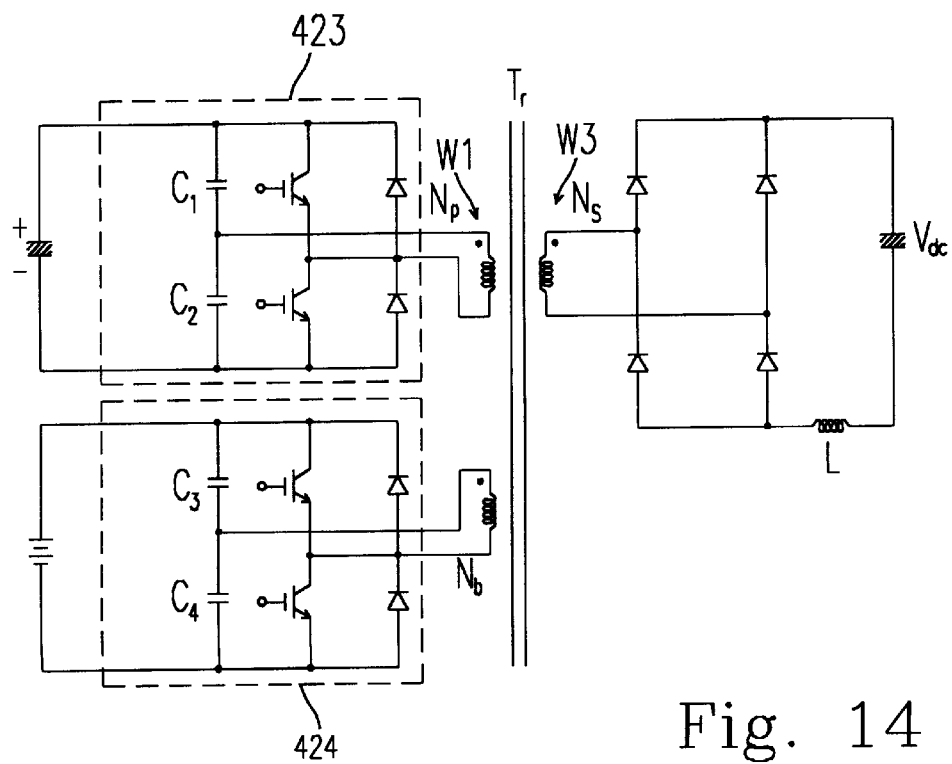
FIG. 14 is a schematic circuit diagram showing an eighth preferred embodiment of a DC/DC converter of a UPS system according to the present invention.
Figure 15:
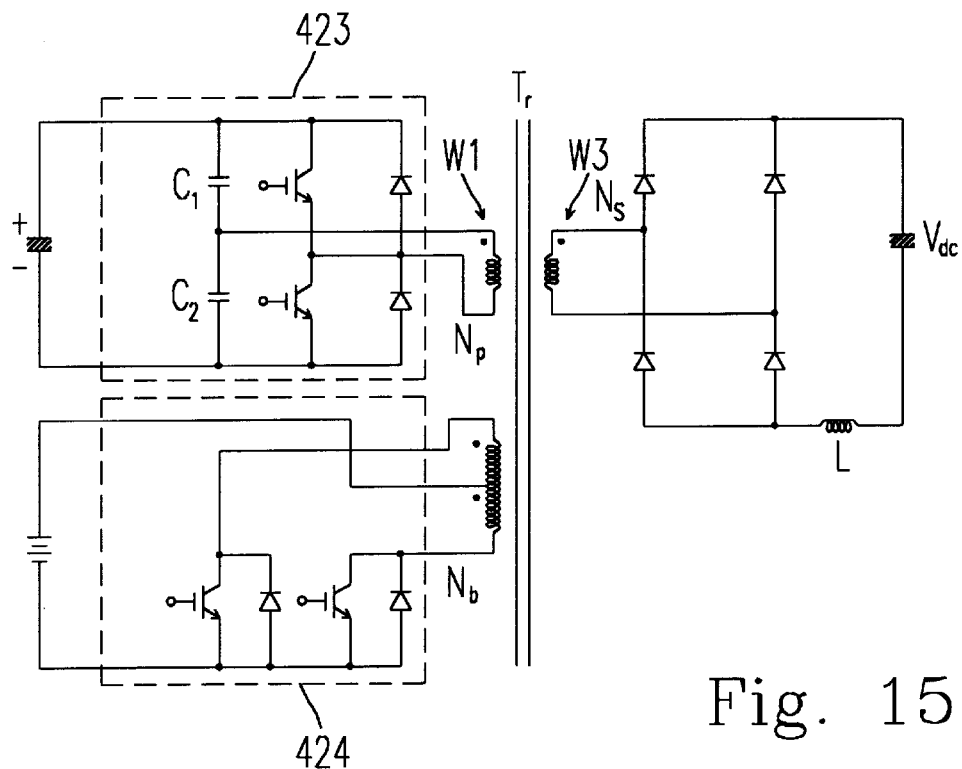
FIG. 15 is a schematic circuit diagram showing a ninth preferred embodiment of a DC/DC converter of a UPS system according to the present invention.

As shown in FIG. 7D, during the t4 period, all transistor switches S3, S4, S7 & S8 are off. For inertial operation, the inductor L will fully conduct output rectifying device 421 to form a short-circuit phenomenon with third winding w3 of transformer Tr so that the original leakage inductance of first winding w1 will transmit power through diodes D3 & D4 to the input side capacitor C and the leakage inductance of second winding w2 will transmit power through diodes DS & D6 back to battery 3.

FIGS. 8–18 shows another eleven preferred embodiments of DC/DC converter 42 all of which together with the first preferred embodiment can be classified into the following 5 classes, which can be selected optionally to be embodied on fist switching circuit 423 and/or second switching circuit 424, with no further detailed descriptions therefor being provided.

Class 1: The switching circuit includes four transistors and four diodes. For example, first circuits 423 in FIGS. 5, 8 & 9 and second circuits 424 in FIGS. 5, 10 & 13.

Class 2: The switching circuit includes two transistors and two diodes, and the winding is a center-tapped winding. For example, first circuits 423 in FIGS. 10, 11 & 12 and second circuits 424 in FIGS. 9, 12 & 15.

Class 3: The switching circuit includes two transistors, two diodes, and two capacitors. For example, first circuits 423 in FIGS. 13, 14 & 15 and second circuits 424 in FIGS. 8, 11 & 14.

Class 4: The switching circuit includes two transistors and four diodes.

Figure 16:
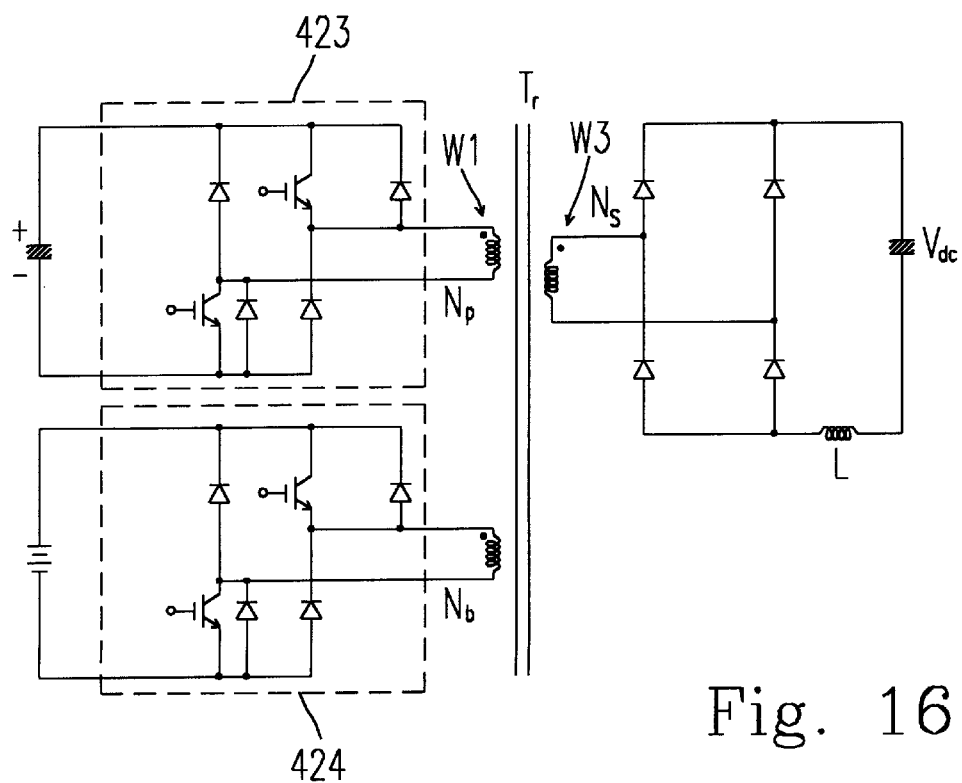
FIG. 16 is a schematic circuit diagram showing a tenth preferred embodiment of a DC/PC converter of a UPS system according to the present invention.
Figure 17:
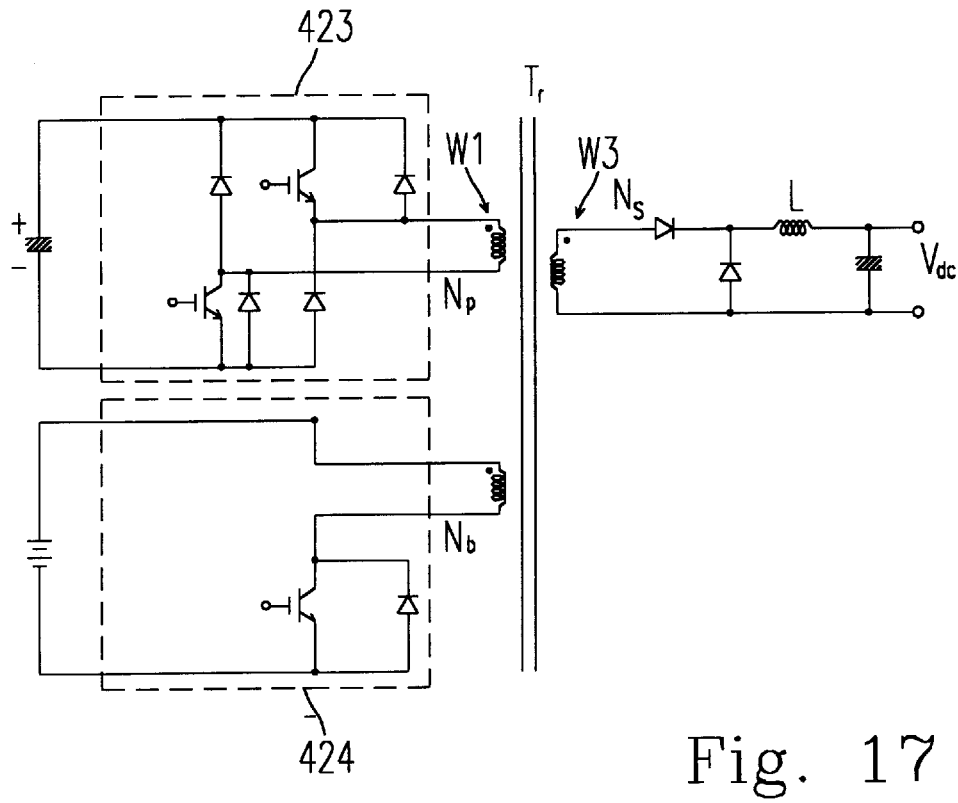
FIG. 17 is a schematic circuit diagram showing an eleventh preferred embodiment of a DC/DC converter of a UPS system according to the present invention.
Figure 18:
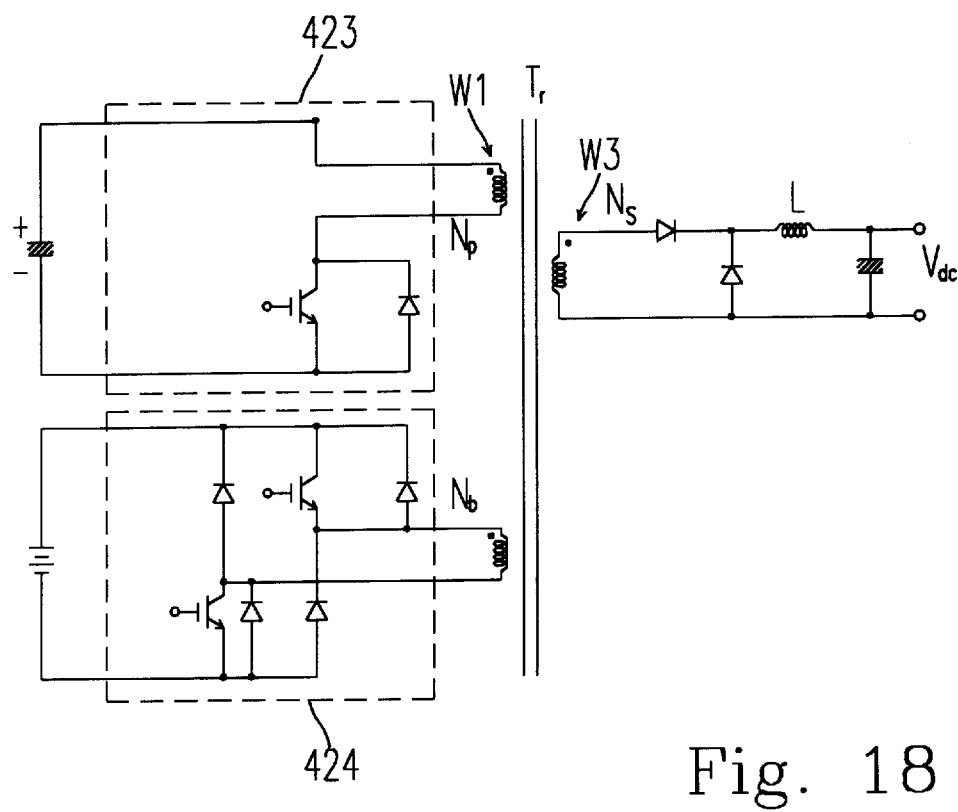
FIG. 18 is a schematic circuit diagram showing a twelfth preferred embodiment of a DC/DC converter of a UPS system according to the present invention.

For example, first circuits 423 in FIGS. 16 & 17 and second circuits 424 in FIGS. 16 & 18.

Class 5: The switching circuit includes a transistor and a diode. For example, first circuit 423 in FIG. 18 and second circuit 424 in FIG. 17.

While the invention has been described in terms of what are presently considered to be the most practical and preferred embodiments,. it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for supplying an uninterrupted power by a utility power source, a power-storing device, and a DC/DC converting device, comprising:

(a) providing said uninterrupted power by said utility power source when an input signal provided by said utility power source is greater than a first specific value;

(b) causing said DC/DC converting device to receive said input signal for generating an output signal to charge said power-storing device when an electric voltage of said power-storing device is less than a second specific value, wherein said power-storing device is charged bv a two-stage method comprising the steps of:

(b)(1) applying a constant current signal as said output signal when said voltage of said power-storing device is less than a third specific value; and (b)(2) applying a constant voltage signal as said output signal when said voltage of said power-storing device is between said second specific value and said third specific value;

(c) varying said output signal in response to said electric voltage of said power-storing device; and (d) causing said power-storing device to provide said uninterrupted power when said input signal is less than said first specific value.

2. A method according to claim 1 wherein in said step (a), said uninterrupted power is provided by said DC/DC converting device.

3. A method according to claim 1 wherein said input signal is an alternative current (AC) signal.

4. A method according to claim 3 wherein before said step (a), said method further comprises a step of (a1) converting said input signal from said AC signal into a direct current (DC) signal.

5. An apparatus for supplying an uninterrupted power by a utility power source, comprising:

a power-storing device for storing an electric signal in a first instance and releasing said electric signal in a second instance;

an AC/DC converting device electrically connected to said utility power source for converting an AC signal provided by said utility power source into a DC signal;

a DC/DC converting device electrically connected to said AC/DC converting device and said power-storing device for receiving said DC signal, generating said uninterrupted power, and storing said electric signal in said power-storing device in response to a voltage thereof in said first instance, and receiving said released electric signal and generating said uninterrupted power in said second instance, wherein said DC/DC converting device comprises:

a DC/DC converter electrically connected to said AC/DC converting device and to said power-storing device for converting one of said DC signal and said electric signal into said uninterrupted power, and for charging said power-storing device; and a pulse-width modulating device controller electrically coupled with said DC/DC converter for driving said DC/DC converter, wherein said DC/DC comprises:

a transformer including a first winding a second winding and a third winding coupled to each other;

a first switching circuit electrically connected to said AC/DC converting device and to said first winding for converting said DC signal into a first signal transmitted to said first winding in said first instance;

a second switching circuit electrically connected to said power-storing device and to said second winding for receiving a second signal generated by said second winding in response to said first signal and converting said second signal into said electric signal to charge said power-storing device in said first instance and for receiving said electric signal from said power-storing device and generating a third signal transmitted to said second winding in said second instance; and a rectifying circuit electrically connected to said third winding for converting one of said first signal and said third signal into said uninterrupted power; and a controlling device electrically connected to said power-stoning device, coupled with said AC/DC converting device for controlling said DC/DC converting device to store said electric signal in said power-storing device and making said AC/DC converting device vary said DC signal in response to said voltage of said power-storing device.

6. An apparatus according to claim 5 wherein said AC/DC converting device comprises:

a power factor controller coupled with said controlling device for receiving a feedback signal generated by said controlling device and generating a driving signal; and an AC/DC converter electrically connected to said utility power source and said power factor controller for receiving said AC signal, and generating and regulating said DC signal in response to said driving signal.

7. An apparatus according to claim 5 wherein said switching circuit is a topology including four transistors and four diodes.

8. An apparatus according to claim 5 wherein said winding is a center-tapped winding.

9. An apparatus according to claim 8 wherein said switching circuit is a topology including two transistors and two diodes.

10. An apparatus according to claim 5 wherein said switching circuit is a topology including two transistors, two diodes, and two capacitors.

11. An apparatus according to claim 5 wherein said switching circuit is a topology including two transistors and four diodes.

12. An apparatus according to claim 5 wherein said switching circuit is a topology including a transistor and a diode.

13. An apparatus according to claim 5 wherein said apparatus further comprises a DC/AC converter electrically connected to said DC/DC converting device for converting said uninterrupted power from a DC-type into an AC-type.

14. An apparatus according to claim 5 wherein said power-storing device is a rechargeable battery.

15. An apparatus for supplying an uninterrupted power by a utility power source, comprising:

a power-storing device for storing an electric signal in a first instance and releasing said electric signal in a second instance;

an AC/DC converting device electrically connected to said utility power source for converting an AC signal provided by said utility power source into a DC signal;

a DC/DC converting device electrically connected to said AC/DC converting device and said power-storing device for receiving said DC signal, generating said uninterrupted power, and storing said electric signal in said power-storing device in response to a voltage thereof in said first instance, and receiving said released electric signal and generating said uninterrupted power in said second instance; and a controlling device electrically connected to said power-storing device, coupled with said AC/DC converting device for controlling said DC/DC converting device to store said electric signal in said power-storing device and making said AC/DC converting device vary said DC signal in response to said voltage of said power storing device, wherein said controlling device comprises:

a first controller coupled with said power-storing device and with said AC/DC converting device for sensing a current of said electric signal flowing into said power-storing device, and sending a first control signal to said AC/DC converting device to decrease said DC signal when said current is greater than a specific value; and a second controller electrically connected to said power-storing device and coupled with said AC/DC converting device for sensing said voltage of said power-storing device and sending a second control signal to said AC/DC converting device to make said AC/DC converting device regulate said DC signal.

* * * * *